United States Patent
Huang-Fu et al.

(10) Patent No.: US 10,952,094 B2
(45) Date of Patent: Mar. 16, 2021

(54) AT COMMANDS FOR 5G QOS MANAGEMENT

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW)

(73) Assignee: MediaTek INC., Hsin-Chu (TW)

(*) Notice: Subject to any disclaimer, the term of this patent is extended or adjusted under 35 U.S.C. 154(b) by 63 days.

(21) Appl. No.: 16/371,442

(22) Filed: Apr. 1, 2019

(65) Prior Publication Data

US 2019/0313277 A1 Oct. 10, 2019

Related U.S. Application Data

(60) Provisional application No. 62/670,629, filed on May 11, 2018, provisional application No. 62/655,137, filed on Apr. 9, 2018.

(51) Int. Cl.
*H04W 28/02* (2009.01)
*H04W 76/20* (2018.01)
*H04W 80/10* (2009.01)
*H04W 48/18* (2009.01)
*H04W 76/22* (2018.01)

(52) U.S. Cl.
CPC ... *H04W 28/0268* (2013.01); *H04W 28/0273* (2013.01); *H04W 48/18* (2013.01); *H04W 76/20* (2018.02); *H04W 80/10* (2013.01)

(58) Field of Classification Search
None
See application file for complete search history.

(56) References Cited

U.S. PATENT DOCUMENTS

| 2015/0181459 A1 | 6/2015 | Zhu .............................. 370/236 |
| 2016/0218962 A1* | 7/2016 | Huang-Fu ............... H04L 47/36 |
| 2018/0199229 A1 | 7/2018 | Lee et al. |

(Continued)

FOREIGN PATENT DOCUMENTS

| CN | 107690161 A | 8/2016 |
| CN | 107734563 A | 8/2018 |
| WO | WO2017018689 A1 | 7/2017 |

OTHER PUBLICATIONS

3GPP TS 27.007 V14.7.0, Mar. 2018 (Year: 2018).*

(Continued)

*Primary Examiner* — Jay L Vogel
(74) *Attorney, Agent, or Firm* — Imperium Patent Works; Zheng Jin (57) ABSTRACT

A method of defining ATtention (AT) commands for 5G QoS management is proposed. AT commands for modifying PDU sessions, creating and modifying QoS flows and QoS rules, and for querying QoS flow and QoS rule parameters are defined for 5G networks. Specifically, the AT command can be a set command for triggering a PDU session modification procedure and thereby creating and modifying QoS flows and QoS rules. For example, AT command +C5GQOS is introduced for creating and modifying QoS flows, AT command +C5GQOSRDP is introduced for retrieving QoS flow parameters, AT command +CGTFT can be reused for creating and modifying QoS rules, and AT command +CGTFTRDP can be reused for retrieving QoS rule parameters.

9 Claims, 6 Drawing Sheets

(56) References Cited

U.S. PATENT DOCUMENTS

2018/0220373 A1* 8/2018 Arzelier ............ H04W 72/0413
2019/0215735 A1   7/2019 Wang et al.
2019/0313276 A1* 10/2019 Huang-Fu ............. H04W 80/10

OTHER PUBLICATIONS

International Search Report and Written Opinion of International Search Authority for PCT/CN2019/081665 dated Jul. 1, 2019 (9 pages).
S2-177050 SA WG2 Meeting #123, Intel, "UE requested PDU session modification", Ljubljana, Slovenia, Oct. 23-27, 2017 (5 pages) *section 4.3.3.2*.
R2-1801866 (revision of R2-1800116) 3GPP TSG-RAN Wg2 #101, Samsung, "on default DRB, default QoS flow and profile", Athens, Greece, Feb. 26-Mar. 2, 2018 (4 pages).

* cited by examiner

| COMMAND | POSSIBLE RESPONSE(S) |
|---|---|
| +C5GQOS=[<cid>[,<5QI>[,<DL_GBR>,<UL_GBR>[,<DL_MBR>,<UL_MBR>]]]]<br>(SET) | |
| +C5GQOS?<br>(READ) | [+C5GQOS: <cid>,<5QI>[,<DL_GBR>,<UL_GBR>[,<DL_MBR>,<UL_MBR>]]]<br>[<CR><LF>+CGEQOS: <cid>,<QCI>,[<DL_GBR>,<UL_GBR>],[<DL_MBR>,<UL_MBR>]<br>[...]] |
| +C5GQOS=?<br>(TEST) | +C5GQOS: (range of supported <cid>s),(list of supported <QCI>s),(list of supported <DL_GBR>s),(list of supported <UL_GBR>s),(list of supported <DL_MBR>s),(list of supported <UL_MBR>s) |

FIG. 5

| COMMAND | POSSIBLE RESPONSE(S) |
|---|---|
| +C5GQOSRDP[=<cid>]<br>(READ) | [+C5GQOSRDP: <cid>,<5QI>[,<DL_GBR>,<UL_GBR>[,<DL_MBR>,<UL_MBR>[,<DL_AMBR>,<UL_AMBR>[,<averaging_window>]]]]]<br>[<CR><LF>+CGEQOSRDP: <cid>,<QCI>[,<DL_GBR>,<UL_GBR>[,<DL_MBR>,<UL_MBR>[,<DL_AMBR>,<UL_AMBR>[,<averaging_window>]]]]]<br>[...]] |
| +C5GQOSRDP=?<br>(TEST) | +C5GQOSRDP: (list of <cid>s associated with active contexts) |

FIG. 6

| COMMAND | POSSIBLE RESPONSE(S) |
|---|---|
| +CGTFT=[<cid>,[<packet filter identifier>,<evaluation precedence index>[,<remote address and subnet mask>[,<protocol number (ipv4) / next header (ipv6)>[,<local port range>[,<remote port range>[,<ipsec security parameter index (spi)>[,<type of service (tos) (ipv4) and mask / traffic class (ipv6) and mask>[,<flow label (ipv6)>[,<direction>[,<local address and subnet mask>][,<QRI>]]]]]]]]]]]<br>(SET) | |
| +CGTFT?<br>(READ) | [+CGTFT: <cid>,<packet filter identifier>,<evaluation precedence index>,<remote address and subnet mask>,<protocol number (ipv4) / next header (ipv6)>,<local port range>,<remote port range>,<ipsec security parameter index (spi)>,<type of service (tos) (ipv4) and mask / traffic class (ipv6) and mask>,<flow label (ipv6)>,<direction>,<local address and subnet mask>[,<QRI>]]<br>[<CR><LF>+CGTFT: <cid>,<packet filter identifier>,<evaluation precedence index>,<remote address and subnet mask>,<protocol number (ipv4) / next header (ipv6)>,<local port range>, <remote port range>,<ipsec security parameter index (spi)>,<type of service (tos) (ipv4) and mask / traffic class (ipv6) and mask>,<flow label (ipv6)>,<direction>,<local address and subnet mask>[,<QRI>]<br>[...]] |
| +CGTFT=?<br>(TEST) | +CGTFT: <PDP_type>,(list of supported <packet filter identifier>s),(list of supported <evaluation precedence index>s),(list of supported <remote address and subnet mask>s),(list of supported <protocol number (ipv4) / next header (ipv6)>s),(list of supported <local port range>s),(list of supported <remote port range>s),(list of supported <ipsec security parameter index (spi)>s),(list of supported <type of service (tos) (ipv4) and mask / traffic class (ipv6) and mask>s),(list of supported <flow label (ipv6)>s),(list of supported <direction>s),(list of supported <local address and subnet mask>s)<br>[<CR><LF>+CGTFT: <PDP_type>,(list of supported <packet filter identifier>s),(list of supported <evaluation precedence index>s),(list of supported <remote address and subnet mask>s),(list of supported <protocol number (ipv4) / next header (ipv6)>s),(list of supported <local port range>s),(list of supported <remote port range>s),(list of supported <ipsec security parameter index (spi)>s),(list of supported <type of service (tos) (ipv4) and mask / traffic class (ipv6) and mask>s),(list of supported <flow label (ipv6)>s),(list of supported <direction>s),(list of supported <local address and subnet mask>s)<br>[...]] |

FIG. 7

| COMMAND | POSSIBLE RESPONSE(S) |
|---|---|
| +CGTFTRDP[=<cid>] (READ) | [+CGTFTRDP: <cid>,<packet filter identifier>,<evaluation precedence index>,<remote address and subnet mask>,<protocol number (ipv4) / next header (ipv6)>,<local port range>,<remote port range>,<ipsec security parameter index (spi)>,<type of service (tos) (ipv4) and mask / traffic class (ipv6) and mask>,<flow label (ipv6)>,<direction>,<NW packet filter Identifier>,<local address and subnet mask>] [,<QRI>]<br>[<CR><LF>+CGTFTRDP: <cid>,<packet filter identifier>,<evaluation precedence index>,<remote address and subnet mask>,<protocol number (ipv4) / next header (ipv6)>,<local port range>, <remote port range>,<ipsec security parameter index (spi)>,<type of service (tos) (ipv4) and mask / traffic class (ipv6) and mask>,<flow label (ipv6)>,<direction>,<NW packet filter Identifier>,<local address and subnetmask>[,<QRI>]<br>[...]] |
| +CGTFTRDP=? (TEST) | +CGTFTRDP: (list of <cid>s associated with active contexts) |

- 901: GENERATE AN AT COMMAND BY AN AP OF A UE IN A WIRELESS NETWORK. THE AT COMMAND COMPRISES A CONTEXT ID TO IDENTIFY A QOS FLOW
- 902: PROVIDE THE AT COMMAND BY THE AP TO A MODEM OF THE UE VIA AN AT COMMAND INTERFACE. THE AT COMMAND COMPRISES QOS CONFIGURATION INFORMATION OF THE QOS FLOW OF A PDU SESSION
- 903: TRANSMIT A PDU SESSION MODIFICATION REQUEST FROM THE MODEM TO THE NETWORK. THE REQUEST COMPRISES QOS PARAMETERS BASED ON THE QOS CONFIGURATION INFORMATION
- 904: RECEIVE A PDU SESSION MODIFICATION COMMAND FROM THE NETWORK IN RESPONSE TO THE REQUEST

AT COMMANDS FOR 5G QOS MANAGEMENT

CROSS REFERENCE TO RELATED APPLICATIONS

This application claims priority under 35 U.S.C. § 119 from U.S. Provisional Application No. 62/655,137, entitled "5GSM Enhancement on Interworking," filed on Apr. 9, 2018; U.S. Provisional Application No. 62/670,629, entitled "Performance Enhancement on 5GSM," filed on May 11, 2018, the subject matter of which is incorporated herein by reference.

TECHNICAL FIELD

The disclosed embodiments relate generally to wireless communication in 5G networks, and, more particularly, to AT commands for 5G session management (5GSM) operations and QoS management.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

Quality of Service (QoS) indicates the performance from the perspective of network users. In LTE Evolved Packet System (EPS), QoS is managed based on EPS bearer in the Evolved Packet Core (EPC) and the Radio Access Network (RAN). In 5G network, QoS flow is the finest granularity for QoS management to enable more flexible QoS control. The concept of QoS flow is like EPS bearer. All types of traffic mapped to the same LTE EPS bearer or to the same 5G QoS flow receive the same level of packet forwarding treatment (e.g., scheduling policy, queue management policy, rate shaping policy, RLC configuration etc.) Providing different QoS forwarding treatment requires separate 5G QoS flow. Each QoS flow is identified by a QoS flow ID (QFI) which is unique within a Protocol data Unit (PDU) session.

Each QoS flow may include multiple QoS rules consisting of QoS profile, packet filters, and precedence order. QoS profile includes QoS parameters and QoS marking. Packet filter is used for binding a QoS flow to a specific QoS marking. Precedence order represents the priority to adapt a QoS rule to a QoS flow. UE performs the classification and marking of uplink (UL) User Plane traffic, i.e., the association of UL traffic to QoS flows based on QoS rules. Each QoS rule is identified by a QoS rule ID (QRI). A default QoS rule is required to be sent to the UE for every PDU session establishment and it is associated with a QoS flow.

The 5G session management (5GSM) functionality can be provided towards the applications and the terminal devices using an Application Programming interface (API). Traditionally, for external applications, the EPS/IP bearer in LTE/4G networks and corresponding PDN connection management and resource allocation functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA). A solution is sought for defining AT commands for 5G QoS management, including creating QoS flows and QoS rules, and querying QoS flow and QoS rule parameters.

SUMMARY

A method of defining ATtention (AT) commands for 5G QoS management is proposed. AT commands for modifying PDU sessions, creating and modifying QoS flows and rules, and for querying QoS flow and rule parameters are defined for 5G networks. Specifically, the AT command can be a set command for triggering a PDU session modification procedure and thereby creating and modifying QoS flows and QoS rules. For example, AT command +C5GQOS is introduced for creating and modifying QoS flows, AT command +C5GQOSRDP is introduced for retrieving QoS flow parameters, AT command +CGTFT can be reused for creating and modifying QoS rules, and AT command +CGTFTRDP can be reused for retrieving QoS rule parameters.

In one embodiment, a UE generates an Attention (AT) command by an Application Processor (AP) of the UE in a wireless network. The AT command comprises a context ID to identify a QoS flow. The AP provides the AT command to a modem of the UE via an AT command interface. The AT command comprises QoS configuration information of the QOS flow of a protocol data unit (PDU) session. The UE transmits a PDU session modification request from the modem to the network. The request comprises QoS parameters based on the QoS configuration information provided by the AT command. The UE receives a PDU session modification command from the network in response to the request.

In another embodiment, a UE establishes a protocol data unit (PDU) in a wireless network. The PDU session is configured with one or more QoS flows and one or more QoS rules. The UE transmits an Attention (AT) command from an Application Processor (AP) of the UE to a modem of the UE. The AT command is a read command for querying QoS parameters of a QoS flow or a QoS rule. The AT command comprises a context ID that identifies the queried QoS flow or QoS rule. The AP receives a response from the modem. The response comprises the QoS parameters of the queried QoS flow or QoS rule.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 illustrates one embodiment of an AT command +CGTFT for creating/modifying a QoS rule in a 5G network in accordance with one novel aspect.

DETAILED DESCRIPTION

Reference will now be made in detail to some embodiments of the invention, examples of which are illustrated in the accompanying drawings.

Figure 1:
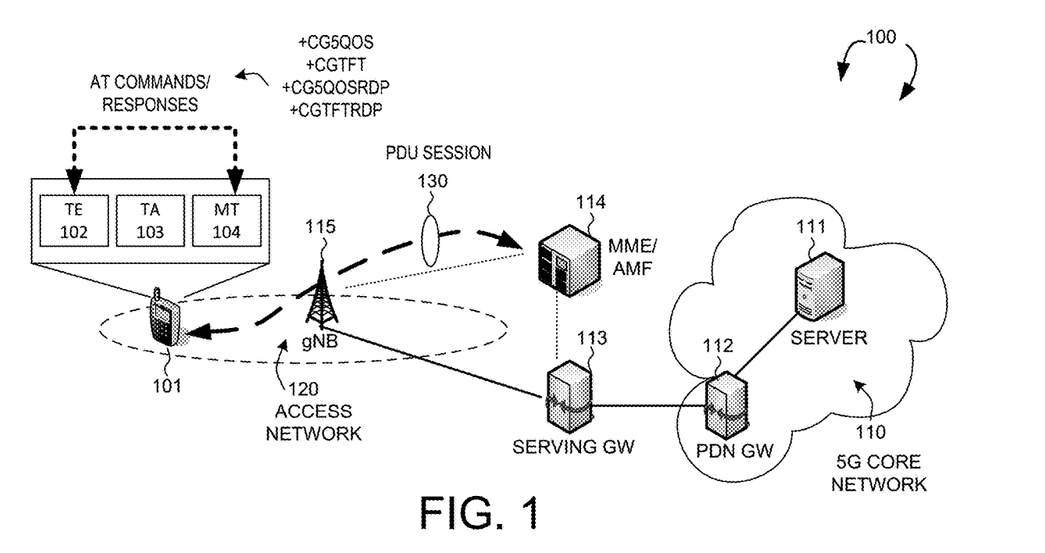
FIG. 1 illustrates a protocol data unit (PDU) session and related PDU session and QoS management procedures via AT commands in a 5G new radio (NR) network in accordance with one novel aspect.

FIG. 1 illustrates a protocol data unit (PDU) session and related PDU session and QoS management procedures via AT commands in a 5G new radio (NR) network 100 in accordance with one novel aspect. 5G NR network 100 comprises application server 111 that provides various services by communicating with a plurality of user equipments (UEs) including UE 101. In the example of FIG. 1, application server 111 and a packet data network gateway (PDN GW) 112 belong to part of a 5G core network 5GC 110. UE 101 and its serving base station gNB 102 belong to part of a radio access network RAN 120. RAN 120 provides radio access for UE 101 via a radio access technology (RAT). Application server 111 communicates with UE 101 through PDN GW 112, serving GW 113, and gNB 102. A mobility management entity (MME) or an access and mobility management function (AMF) 114 communicates with gNB 102, serving GW 113 and PDN GW 112 for access and mobility management of wireless access devices in 5G NR network 100. UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

5G networks are packet-switched (PS) Internet Protocol (IP) networks. This means that the networks deliver all data traffic in IP packets, and provide users with Always-On IP Connectivity. When UE joins an 5G network, a Packet Data Network (PDN) address (i.e., the one that can be used on the PDN) is assigned to the UE for its connection to the PDN. In 4G LTE, EPS calls the UE's "IP access connection" an evolved packet system (EPS) bearer, which is a connection between the UE and the PDN GW. The PDN GW is the default gateway for the UE's IP access. EPS has defined a Default EPS Bearer to provide the IP Connectivity that is Always-On. In 5G, a PDU session establishment is a parallel procedure of PDN connection procedure in 4G. A PDU session, e.g., 130, defines the association between the UE and the data network that provides a PDU connectivity service. Each PDU session is identified by a PDU session ID, and may include multiple QoS flows and QoS rules. Each QoS flow is identified by a QoS flow ID (QFI), while each QoS rule is identified by a QoS rule ID (QRI) within a QoS flow. Each PDU session is has one default QoS rule.

The PDN connection/EPS bearer in 4G and the PDU session/QoS flow in 5G, and corresponding connection and session management functionality can be provided towards the applications and the terminal devices using an Application Programming interface (API) based on Packet Data Protocol (PDP) contexts. A PDP context can be regarded as a data record of parameters that characterize a specific bearer and connection to the target PDN. Multiple applications running on one UE may require multiple connections/sessions to one or more PDNs, so that multiple PDP contexts may have to be defined. These multiple PDP contexts can be grouped into primary PDP contexts (also referred to as non-secondary PDP contexts) and secondary PDP contexts. Multiple primary PDP contexts provide connections/sessions to different PDNs are each associated with a unique IP address.

For external applications, the connection and session management functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA). In the example of FIG. 1, UE 101 comprises a TE 102, a TA 103, and an MT 104. TE can use AT commands to control MT to perform connection and session management functionality. For example, TE can use AT commands for querying PDP context information and for setting PDP context parameters. 3GPP TS 27.007 defines a plurality of AT commands for controlling MT functions and GPRS packet domain services based on PDP contexts. Each AT command includes a Context Identification (CID) parameter as reference to the specific PDP context to which the AT command applies. The TA, MT and TE may be implemented in the form of separate or integrated entities as needed. The span of control of the defined AT commands allows handling of any physical implementation that may lead to: TA, MT and TE as three separate entities; TA integrated under the MT cover, and TE implemented as a separate entity; TA integrated under the TE cover, and MT implemented as a separate entity; and TA and MT integrated under the TE cover as a single entity.

In accordance with one novel aspect, AT commands for modifying PDU sessions, creating and modifying QoS flows and rules, and for querying QoS flow and rule parameters are defined for 5G networks. In one embodiment, TE 102 sends an AT command to TA 103, which converts to an MT control to be sent to MT 104. The AT commands can be a read command or a set command. In response, MT 104 sends an MT status back to TA 103, which converts to a response to be sent to TE 102. Specifically, the AT command can be a set command for triggering a PDU session modification procedure and thereby creating and modifying QoS flows and QoS rules. For example, AT command +C5GQOS is introduced for creating and modifying QoS flows, AT command +C5GQOSRDP is introduced for retrieving QoS flow parameters, AT command +CGTFT can be reused for creating and modifying QoS rules, and AT command +CGTFTRDP can be reused for retrieving QoS rule parameters.

Figure 2:
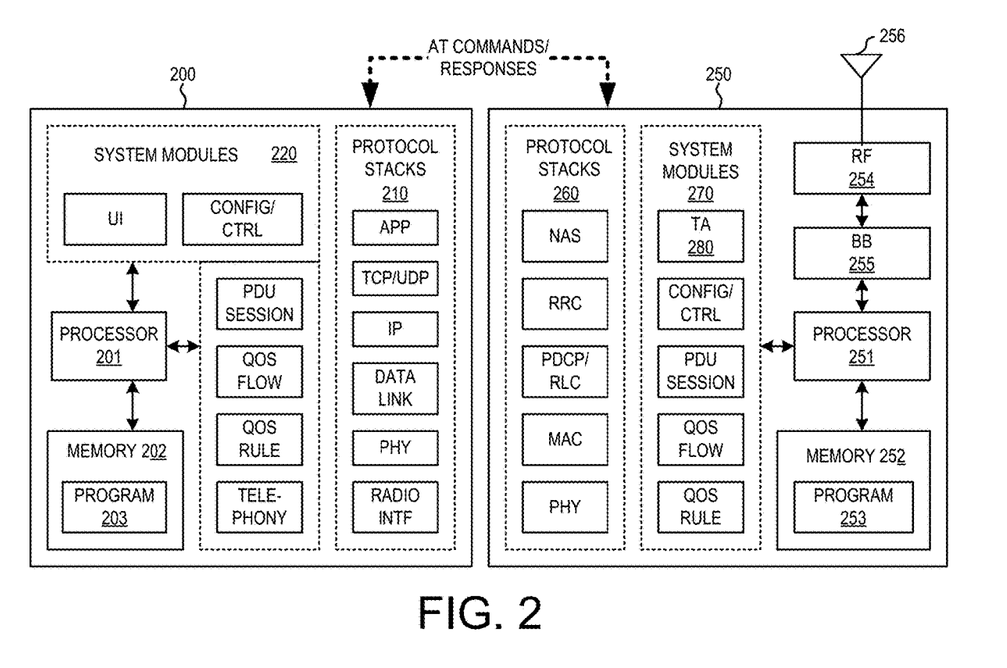
FIG. 2 illustrates a simplified block diagram of an architecture comprising a Terminal Equipment (TE) and a Mobile Termination (MT) in accordance with one novel aspect.

FIG. 2 illustrates a simplified block diagram of an architecture comprising a Terminal Equipment (TE) and a Mobile Termination (MT) in accordance with one novel aspect. TE 200 comprises a processor 201, memory 202, and protocol stacks 210 including Application (APP) layer, Transport (TCP/UDP) layer, Network (IP) layer, Data Link layer, and Physical (PHY) layer. TE 200 further comprises system control modules and circuits 220 including a user interface, a configuration and control module, a PDU session handler, a QoS flow handler, a QoS rule handler, and a telephony module. Processor 201 processes different applications and invokes different system control modules to perform various features of TE 200. Memory 202 stores program instructions and data 203 to control the operations of TE 200. The system control modules and circuits can be implemented and configured to carry out functional tasks of TE 200. Note that TE is also referred to as Application Processor (AP). Typically, TE 200 is also equipped with telephony framework circuits (e.g., a dialer, a call manager etc.) to support voice call functionality. In addition, TE 200 also supports the AT commands as defined by 3GPP TS27.007 for controlling MT functions and GPRS packet domain services based on PDP contexts for each PDU session identified by CID.

MT 250 has an antenna 256, which transmits and receives radio signals. A RF transceiver module 254, coupled with the antenna, receives RF signals from antenna 256, converts them to baseband signals and sends them to processor 251 via baseband module 255. RF transceiver 254 also converts received baseband signals from processor 251 via baseband module 255, converts them to RF signals, and sends out to antenna 256. Processor 251 processes the received baseband signals and invokes different functional modules to perform features in MT 250. Memory 252 stores program instructions and data 253 to control the operations of MT 250. MT 250 also comprises a set of protocol stacks 260 and control circuits including various system modules 270 to carry out functional tasks of MT 250. Protocol stacks 260 comprises Non-Access-Stratum (NAS) layer, Radio Resource Control (RRC) layer, Packet Data Convergence Protocol/Radio Link Control (PDCP/RLC) layer, Media Access Control (MAC) layer, and Physical (PHY) layer. System modules 270 comprises a configuration module, a control module, a PDU session handler, a QoS flow handler, and a QoS rule handler. MT is also referred to as modem. In the example of FIG. 2, MT 250 further comprises a Terminal Adaptor (TA 280) that receives and transmits AT commands and converts the AT commands to be processed by processor 251 for controlling MT functions. In one example, TA 280 receives an AT set command from a TE for modifying a PDU session. In another example, TA 280 receives an AT read command from a TE for the MT to provide QoS flow and QoS rule parameters to the TE.

Figure 3:
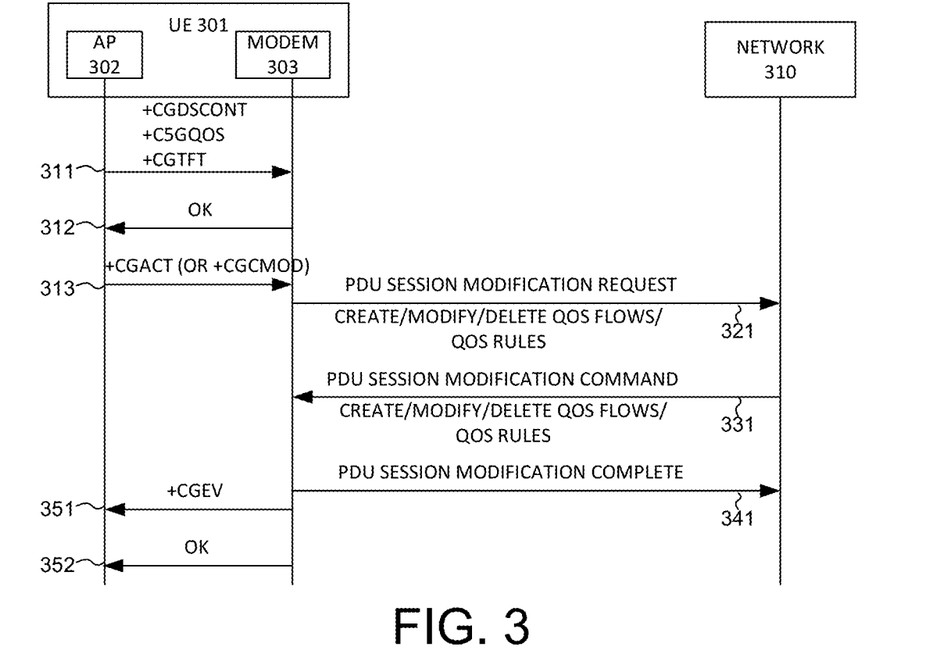
FIG. 3 illustrates a PDU session modification procedure triggered by AT command +CGDSCONT, +C5GQOS or +CGTFT, and +CGACT/+CGCMOD in a 5G network in accordance with one novel aspect.

FIG. 3 illustrates a PDU session modification procedure triggered by AT command +CGDSCONT, +C5GQOS or +CGTFT, and +CGACT/+CGCMOD in a 5G network in accordance with one novel aspect. Network 310 provides PDU connectivity service to UE 301 via a PDU session. UE 301 comprises an AP 302 and a modem 303, communicating with each other via AT commands. In the example of FIG. 3, AP 302 uses AT commands for controlling modem 303 to modify a PDU session. In step 311, AP 302 sends an AT configuration command +CGDSCONT, +C5GQOS or +CGTFT to modem 303 to set the parameters needed for the PDU session modification, and receives OK from modem 303 (step 312). In step 313, AP 302 sends another AT action command +CGACT/+CGCMOD to modem 303 to trigger the PDU session modification procedure. AT command +CGDSCONT comprises a context ID <cid> and a non-secondary PDP context identifier <p_cid> provided by the AP. The <cid> is used to identify the PDP context or the QoS flow as the QoS Flow ID to which the AT command applies between AP and modem. The <p_cid> is used to identify the PDU session to which the QoS flow to be created is associated with. The AT set command +C5GQOS carries a list of parameters for the to be created or modified QoS flow, and a corresponding context ID<cid> to identify the QoS flow. AT set command +CGTFT carries a list of parameters for the to be created or modified QoS rule, and a corresponding context ID<cid> and a QoS Rule ID<RQI> to identify the QoS rule. Upon receiving the AT command +CGACT/+CGCMOD, in step 321, modem 303 sends a PDU session modification request to network 310. In step 331, modem 303 receives a PDU session modification command from network 310. In step 341, modem 303 replies to network 310 with a PDU session modification complete message. In step 351, modem 303 sends a response +CGEV back to AP 302 and completes the PDU session modification procedure. In step 352, modem 303 send OK or ERROR to complete the whole AT command procedure.

Figure 4:
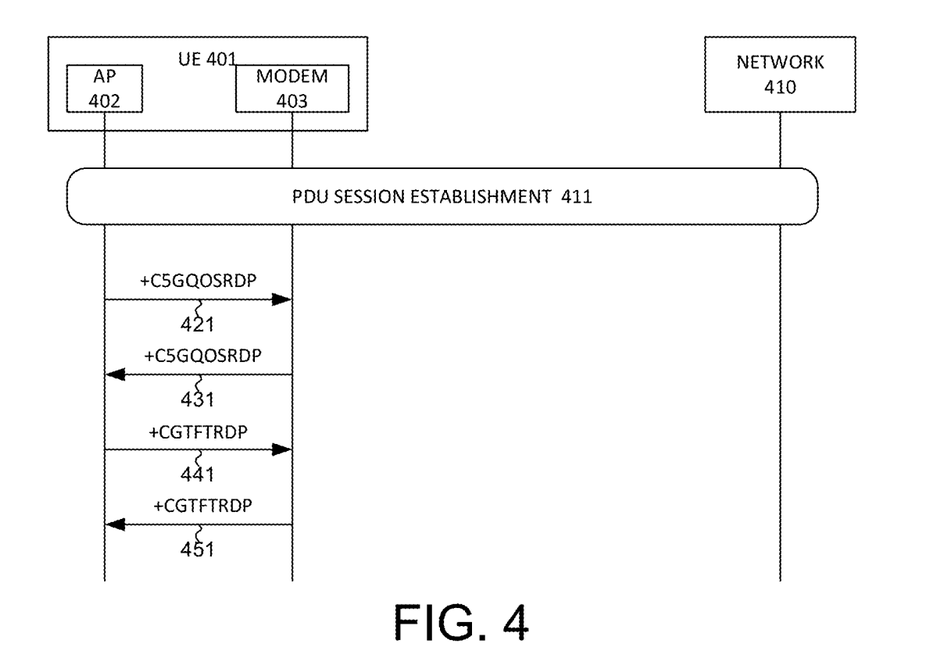
FIG. 4 illustrates AT command +C5GQOSRDP and +CGTFTRDP in a 5G network for querying QoS flow and rule parameters in accordance with one novel aspect.

FIG. 4 illustrates AT command +C5GQOSRDP and +CGTFTRDP in a 5G network for querying QoS flow and QoS rule parameters in accordance with one novel aspect. Network 410 provides PDU connectivity service to UE 401 via a PDU session. UE 401 comprises an AP 402 and a modem 403, communicating with each other via AT commands. In the example of FIG. 4, AP 402 uses AT commands for retrieving parameters of QoS flows and QoS rules of an established PDU session. In step 411, UE 401 establishes a PDU session with network 410. The PDU session is configured with one or more QoS flows and one or more QoS rules. One of the QoS rule is a default QoS rule and is associated with one QoS flow. In step 421, AP 402 sends an AT read command +C5GQOSRDP to modem 403 for querying QoS parameters associated with a context ID<cid>. The <cid> here is served as an index between AP and modem to identify a QoS flow of the PDU session. Hence here AP would use <cid> to query the information of the QoS flow, and the modem would map the <cid> to the corresponding QFI, and respond queried parameters accordingly. The queried parameters include 5QI, guaranteed bit rate (GBR) for UL and DL, maximum bit rate (MBR) for UL and DL, aggregate maximum bit rate (AMBR) for UL and DL, and averaging window. In step 431, modem 403 replies back the queried parameters by +C5GQOSRDP, and an OK as the result.

In step 441, AP 402 sends an AT read command +CGTFTRDP to modem 403 for querying parameters associated with a context ID<cid>. The <cid> here is served as an index between AP and modem to identify a QoS flow which includes one or more QoS rules or one of more packet filters. Hence here AP would use <cid> to query the information of the QoS rule or packet filter, and the modem would map the <cid> to QoS flow ID, and respond queried parameters of the corresponding packet filter(s) and QoS rule(s) accordingly. The queried parameters include packet filter identifier, evaluation precedence index, remote address and mask, protocol number, next header, port range, ipsec security index, type of service and mask, traffic class and mask, flow label, direction, NW packet filter identifier, local address and mask, and QRI. In step 451, modem 403 replies back the queried parameters by +CGTFTRDP, and an OK as the result.

Figure 5:
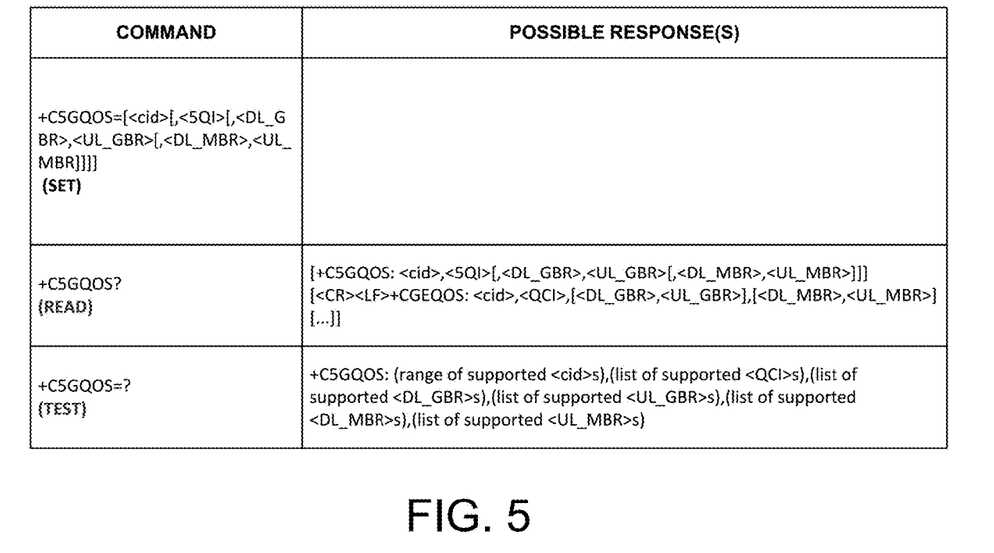
FIG. 5 illustrates one embodiment of AT command +C5GQOS for creating/modifying a QoS flow in a 5G network in accordance with one novel aspect.

FIG. 5 illustrates one embodiment of AT command +C5GQOS for creating/modifying a QoS flow in a 5G network in accordance with one novel aspect. As illustrated in FIG. 5, the AT+C5GQOS command is a set or read or test command. The set command specifies PDP context parameters values for a PDP context identified by the local context identifier parameter <cid>, and also allows the TE to specify whether security protected transmission of ESM information is requested, because the PCO can include information that requires ciphering. There can be other reasons for the UE to use security protected transmission of ESM information, e.g., if the UE needs to transfer an APN. The number of PDP contexts that may be in a defined state at the same time is given by the range returned by the test command. The execution of the read command returns the current settings for each defined context. The execution of the test command returns values supported as compound values.

The defined values of the relevant information include: <cid>: specifies a particular PDP context definition; <5QI>: represents a 5G QoS identifier, which is a scalar that is used as a reference to a specific QoS forwarding behavior; <DL_GBR>: specifies downlink GBR of the QOS flow; <UL_GBR>: specifies uplink GBR of the QoS flow; <DL_MBR>: specifies downlink MBR of the QoS flow; <UL_MBR>: specifies uplink MBR of the QoS flow.

Figure 6:
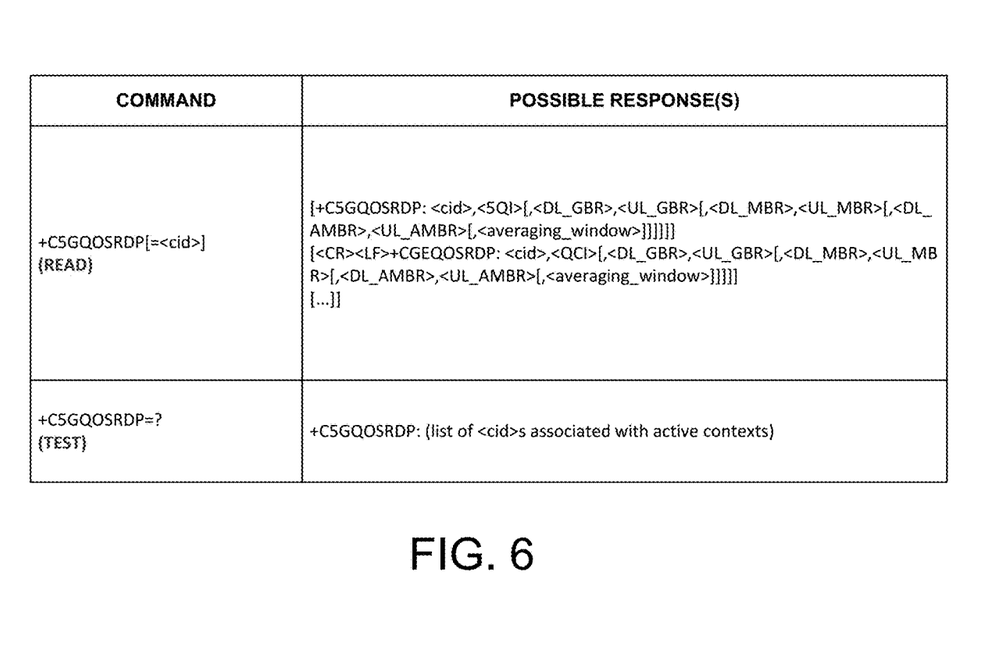
FIG. 6 illustrates one embodiment of an AT command +C5GQOSRDP for retrieving a list of parameters of a QoS flow in accordance with one novel aspect.

FIG. 6 illustrates one embodiment of an AT command +C5GQOSRDP for retrieving a list of parameters of a QoS flow in accordance with one novel aspect. As illustrated in FIG. 6, the AT+C5GQOSRDP command is a read or test command. The execution of the read command returns the relevant information for an active non-secondary PDP context with the context identifier <cid>. If the parameter <cid> is omitted in the AT command, then the relevant information for all active non-secondary PDP contexts is returned. The execution of the test command returns a list of <cid>s associated with active non-secondary PDP contexts.

The defined values of the relevant information include: <cid>: specifies a particular PDP context identifier used by AP to indicate which QoS flow it is querying; <5QI>: represents a 5G QoS identifier, which is a scalar that is used as a reference to a specific QoS forwarding behavior; <DL_GBR>: specifies downlink GBR of the QOS flow; <UL_GBR>: specifies uplink GBR of the QoS flow; <DL_MBR>: specifies downlink MBR of the QoS flow; <UL_MBR>: specifies uplink MBR of the QoS flow; <DL_AMBR>: specifies downlink AMBR of the PDU session; <UL_AMBR>: specifies uplink AMBR of the PDU session; and <averaging_window>: indicates the averaging window size.

FIG. 7 illustrates one embodiment of an AT command +CGTFT for creating/modifying a QoS rule in a 5G network in accordance with one novel aspect. As illustrated in FIG. 7, the AT+CGTFT command is a set or read or test command. The set command specifies PDP context parameters values for a PDP context identified by the local context identifier parameter <cid>, and also allows the TE to specify whether security protected transmission of ESM information is requested, because the PCO can include information that requires ciphering. The number of PDP contexts that may be in a defined state at the same time is given by the range returned by the test command. The execution of the read command returns the current settings for each defined context. The execution of the test command returns values supported as compound values.

The defined values of the relevant information include: <cid>: specifies a particular PDP context definition; <packet filter identifier>: identifies the packer filter; <evaluation precedence index>: an index for evaluation precedence; <remote address and subnet mask>: specifies remote IP address and subnet; <protocol number/next header>: protocol number for IPv4 and next hear for IPv6; <local port range>: specifies local port range; <remote port range>: specifies remote port range; <ipsec security parameter index>: specifies ipsec spi; <type of service and mask/traffic class and mask>: tos and mask for IPv4, and traffic class and mask for IPv6; <flow label>: specifies flow label; <direction>: specifies direction; <local address and subnet mask>: specifies local IP address and subnet; <QRI>: QoS rule ID.

Figure 8:
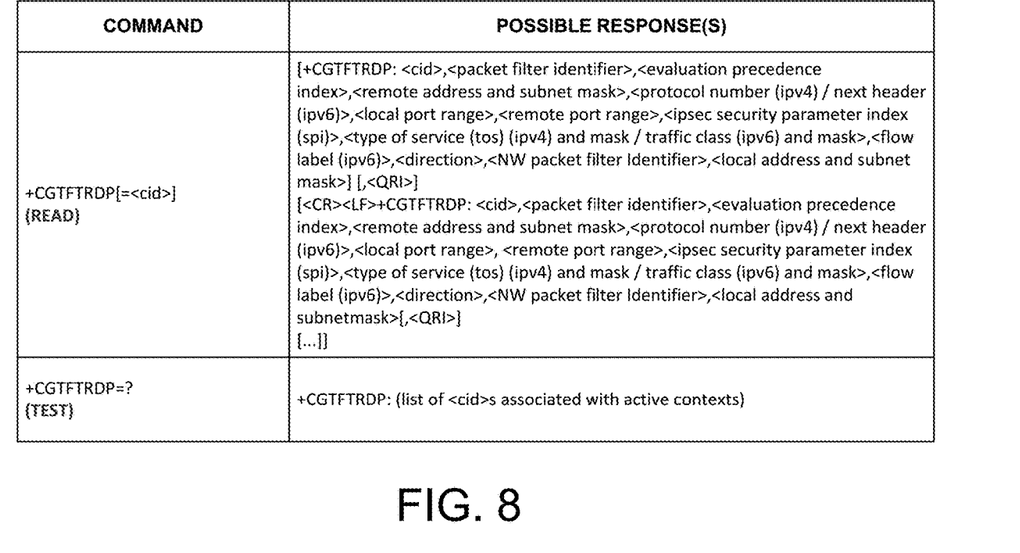
FIG. 8 illustrates one embodiment of an AT command +CGTFTRDP for retrieving a list of parameters of a QoS rule in accordance with one novel aspect.

FIG. 8 illustrates one embodiment of an AT command +CGTFTRDP for retrieving a list of parameters of a QoS rule in accordance with one novel aspect. As illustrated in FIG. 8, the AT+CGTFTRDP command is a read or test command. The execution of the read command returns the relevant information for an active non-secondary PDP context with the context identifier <cid>. If the parameter <cid> is omitted in the AT command, then the relevant information for all active non-secondary PDP contexts is returned. The execution of the test command returns a list of <cid>s associated with active non-secondary PDP contexts.

The defined values of the relevant information include: <cid>: specifies a particular PDP context identifier used by AP to indicate which QoS rule or packet filter it is querying; <packet filter identifier>: identifies the packer filter; <evaluation precedence index>: an index for evaluation precedence; <remote address and subnet mask>: specifies remote IP address and subnet; <protocol number/next header>: protocol number for IPv4 and next hear for IPv6; <local port range>: specifies local port range; <remote port range>: specifies remote port range; <ipsec security parameter index>: specifies ipsec spi; <type of service and mask/traffic class and mask>: tos and mask for IPv4, and traffic class and mask for IPv6; <flow label>: specifies flow label; <direction>: specifies direction; <local address and subnet mask>: specifies local IP address and subnet; <QRI>: QoS rule ID.

Figure 9:
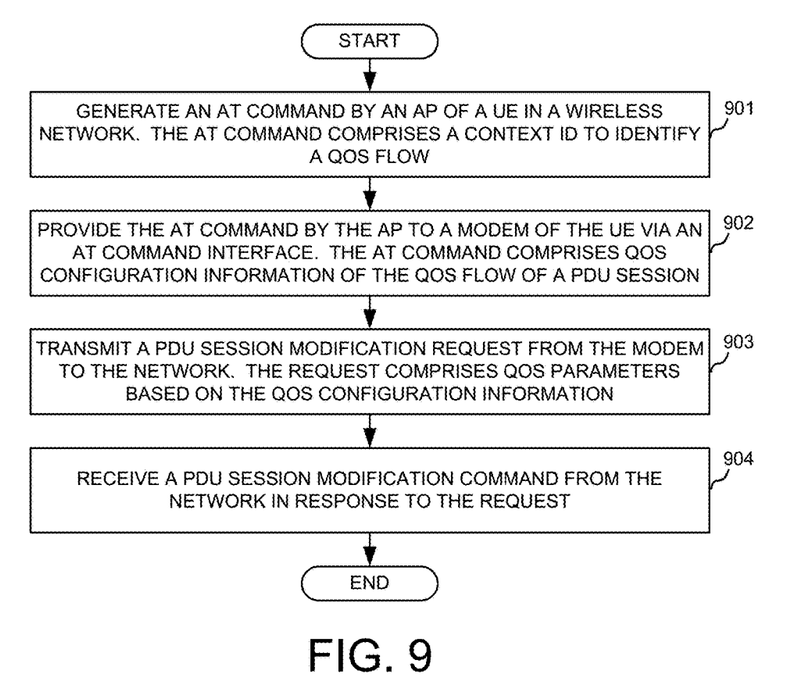
FIG. 9 illustrates a flow chart of a method of creating/modifying a QoS flow or QoS rule via AT commands by a UE in accordance with one novel aspect.

FIG. 9 illustrates a flow chart of a method of creating/modifying a QoS flow or QoS rule via AT commands by a UE in accordance with one novel aspect. In step 901, a UE generates an Attention (AT) command by an Application Processor (AP) of the UE in a wireless network. The AT command comprises a context ID to identify a QoS flow. In step 902, the AP provides the AT command to a modem of the UE via an AT command interface. The AT command comprises QoS configuration information of the QOS flow of a protocol data unit (PDU) session. In step 903, the UE transmits a PDU session modification request from the modem to the network. The request comprises QoS parameters based on the QoS configuration information provided by the AT command. In step 904, the UE receives a PDU session modification command from the network in response to the request.

Figure 10:
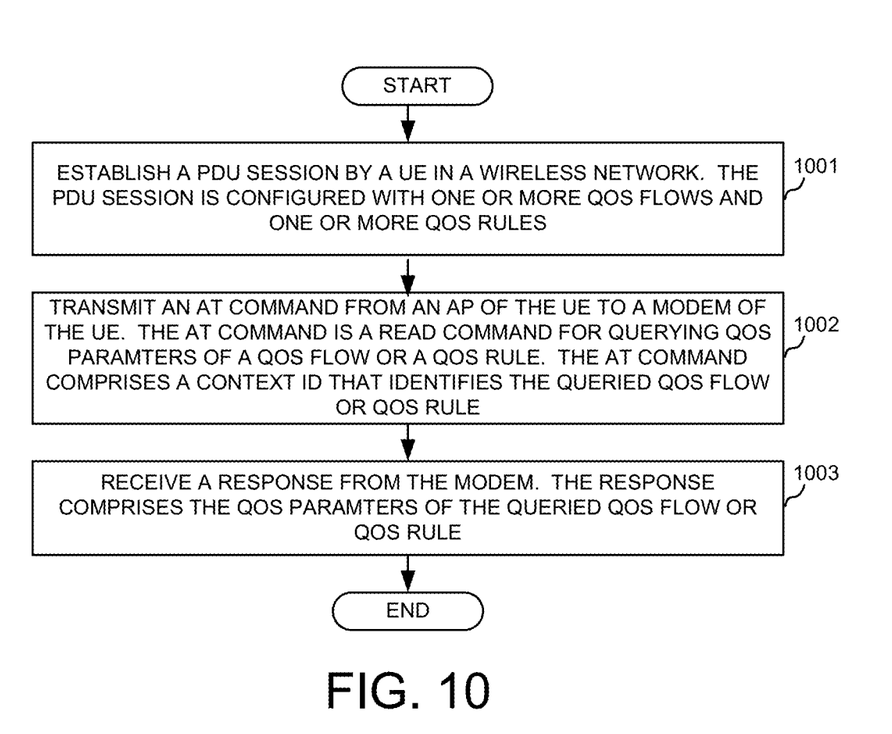
FIG. 10 illustrates a flow chart of a method of querying QoS flow or QoS rule parameters via AT commands by a UE in accordance with one novel aspect.

FIG. 10 illustrates a flow chart of a method of querying QoS flow or QoS rule parameters via AT commands by a UE in accordance with one novel aspect. In step 1001, a UE establishes a protocol data unit (PDU) in a wireless network. The PDU session is configured with one or more QoS flows and one or more QoS rules. In step 1002, the UE transmits an Attention (AT) command from an Application Processor (AP) of the UE to a modem of the UE. The AT command is a read command for querying QoS parameters of a QoS flow or a QoS rule. The AT command comprises a context ID that identifies the queried QoS flow or QoS rule. In step 1003, the AP receives a response from the modem. The response comprises the QoS parameters of the queried QoS flow or QoS rule.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   generating an Attention (AT) command by an Application Processor (AP) of a User Equipment (UE) in a wireless network, wherein the AT command comprises a context ID to identify a Quality of Service (QoS) flow;
   providing the AT command by the AP to a modem of the UE via an AT command interface, wherein the AT command comprises QoS configuration information of the QOS flow of a protocol data unit (PDU) session;
   transmitting a PDU session modification request from the modem to the network, wherein the request comprises QoS parameters based on the QoS configuration information provided by the AT command, wherein the AT command is a set command +CGTFT for configuring the QoS parameters for a QoS rule of the PDU session, and wherein the QoS parameters comprise a packet filter identifier, an evaluation precedence index, a type of service, and followed by a QoS rule identifier; and
   receiving a PDU session modification command from the network in response to the request.

2. The method of claim 1, wherein the AP provides a second AT command +CGACT or +CGCMOD to the modem for triggering the PDU session modification request.

3. The method of claim 1, wherein the AP provides a second AT command +CGDSCONT for creating a QoS flow or creating a QoS rule for the PDU session.

4. A User Equipment (UE), comprising:
   an Application Processor (AP) that generates an Attention (AT) command in a wireless network, wherein the AT command comprises a context ID that identifies a Quality of Service (QoS) flow;
   a mobile terminal (MT) that receives the AT command via an AT command interface, wherein the AT command comprises QoS configuration information of the QOS flow of a protocol data unit (PDU) session;
   a transmitter that transmits a PDU session modification request from the MT to the network, wherein the request comprises QoS parameters based on the QoS configuration information provided by the AT command, wherein the AT command is a set command +CGTFT for configuring the QoS parameters for a QoS rule of the PDU session, and wherein the QoS parameters comprise a packet filter identifier, an evaluation precedence index, a type of service, and followed by a QoS rule identifier; and
   a receiver that receives a PDU session modification command from the network in response to the request.

5. The UE of claim 4, wherein the AP provides a second AT command +CGACT or +CGCMOD to the modem for triggering the PDU session modification request.

6. The UE of claim 4, wherein the AP provides a second AT command +CGDSCONT for creating a QoS flow or creating a QoS rule for the PDU session.

7. A method comprising:
   establishing a protocol data unit (PDU) session by a user equipment (UE) in a wireless network, wherein the PDU session is configured with one or more Quality of Service (QoS) flows and one or more QoS rules;
   transmitting an Attention (AT) command from an Application Processor (AP) of the UE to a modem of the UE, wherein the AT command is a read command for querying QoS parameters of a QoS flow or a QoS rule, wherein the AT command comprises a context ID that identifies the queried QoS flow or QoS rule; and
   receiving a response from the modem, wherein the response comprises the QoS parameters of the queried QoS flow or QoS rule, wherein the QoS parameters comprise a 5G QoS identifier, a downlink guaranteed flow bit rate, an uplink guaranteed flow bit rate, a downlink maximum flow bit rate, an uplink maximum flow bit rate, a downlink aggregated maximum bit rate of the PDU session, an uplink aggregated maximum bit rate of the PDU session, and an averaging window size.

8. The method of claim 7, wherein the AT command is an AT read command +C5GQOSRDP for querying the QoS flow.

9. A method comprising:
   establishing a protocol data unit (PDU) session by a user equipment (UE) in a wireless network, wherein the PDU session is configured with one or more Quality of Service (QoS) flows and one or more QoS rules;
   transmitting an Attention (AT) command from an Application Processor (AP) of the UE to a modem of the UE, wherein the AT command is a read command +CGTFTRDP for querying QoS parameters of a QoS flow and a QoS rule, wherein the AT command +CGTFTRDP comprises a context ID that identifies the queried QoS flow and QoS rule; and
   receiving a response from the modem, wherein the response comprises the QoS parameters of the queried QoS flow and QoS rule, and wherein the QoS parameters comprise a packet filter identifier, an evaluation precedence index, a type of service, and followed by a QoS rule identifier.

* * * * *